United States Patent [19]
Räbinä et al.

[11] Patent Number: 5,953,675
[45] Date of Patent: Sep. 14, 1999

[54] METHOD FOR PROCESSING INFORMATION IN A WIRELESS LOCAL LOOP TERMINAL AND A TERMINAL

[75] Inventors: Ossi Räbinä, Tyrnävä; Janne Paksuniemi, Oulu; Keijo Keränen, Oulu; Markku Tarkiainen, Oulu; Harri Lilja, Oulu; Sanna Rahikkala, Oulu; Esko Törmäkangas, Oulu; Kai Nybacka, Oulu, all of Finland

[73] Assignee: Nokia Mobile Phones Ltd., Espoo, Finland

[21] Appl. No.: 08/963,007

[22] Filed: Nov. 3, 1997

[30] Foreign Application Priority Data

Nov. 4, 1996 [FI] Finland ................................. 964425

[51] Int. Cl.⁶ ............................................ H04Q 7/32
[52] U.S. Cl. ..................... 455/557; 455/556; 455/550; 455/552; 455/403
[58] Field of Search ..................... 455/557, 556, 455/550, 555, 424, 425, 403, 412, 415, 462, 465, 69, 552; 358/400, 403, 451, 442

[56] References Cited

U.S. PATENT DOCUMENTS

| | | | |
|---|---|---|---|
| 4,658,096 | 4/1987 | West, Jr. et al. | 379/59 |
| 4,737,975 | 4/1988 | Shafer | 379/58 |
| 4,775,997 | 10/1988 | West, Jr. et al. | 379/58 |
| 4,922,517 | 5/1990 | West, Jr. et al. | 379/58 |
| 5,117,450 | 5/1992 | Joglekar et al. | 379/58 |
| 5,748,610 | 5/1998 | Bustamante et al. | 455/69 |
| 5,796,729 | 8/1998 | Greaney et al. | 455/462 |
| 5,819,177 | 10/1998 | Vucetic et al. | 455/425 |

OTHER PUBLICATIONS

[6] CCITT Terminal Equipment and Protocols for Telematic Services; Recommendation T.30.

*Primary Examiner*—Wellington Chin
*Assistant Examiner*—Keith Ferguson
*Attorney, Agent, or Firm*—Perman & Green, LLP

[57] ABSTRACT

The invention relates to a method for processing information in a wireless local loop (WLL) terminal and a WLL terminal. According to the present invention, a WLL terminal comprises a display device, and character-based information, first data, is converted to second data for displaying it on the display. Said first data is advantageously converted in such a manner that a bitmap (222) is first formed on the basis of the character-based first data and then a line code (223) is formed on the basis of said bitmap. The line code is transferred (224, 225) by means of known facsimile transmission technology to a fax machine serving as a display device and displayed by the fax machine (226). The invention can be applied in wireless local loops to implement services that use information in character format. Such services include the short message service and display of caller data.

16 Claims, 3 Drawing Sheets

METHOD FOR PROCESSING INFORMATION IN A WIRELESS LOCAL LOOP TERMINAL AND A TERMINAL

BACKGROUND OF THE INVENTION

The invention relates to a method for processing information in a wireless local loop (WLL) terminal and to a WLL terminal. The invention can be applied in wireless local loop systems to realize services using character-based information.

WLL systems provide an economic way of expanding the public switched telephone network to new subscribers as the expansion can be realized without installing new cables for the new subscriber connections. Terminals in wireless local loop (WLL) networks comprise a telephone set or other subscriber equipment with the transceiver unit connected to it which are suitable to be connected to the public switched telephone network. The matching between the subscriber equipment and the transceiver unit is provided by a line adapter. Generally, the transceiver unit is connected via a radio path to a cellular service such as the GSM system. Often, a subscriber connection is used for transferring both speech and graphic information such as facsimiles, in which case the terminal comprises a telephone apparatus and a fax machine, for example. However, as regards the operation of such a WLL terminal, there are some restrictions to be considered, as will be shown later on.

Next, we will give a description of the prior art by first disclosing in greater detail a known WLL terminal and how it is connected to a WLL telecommunication system.

FIG. 1 shows a known arrangement for realizing a WLL terminal. A WLL terminal 100 is connected to a cellular system which includes base stations 151 for transferring information via the radio path to terminals by means of an antenna 150. The base stations are connected to base station controllers 152 which are further connected to an exchange 153. The exchange 153 is connected to a public switched telephone network PSTN. The exchange includes a home location register HLR which stores information about the subscribers in the system. In addition, digital cellular systems may include a short message service center SMSC 155 for conveying short messages. However, short messages cannot be communicated with prior art WLL terminals.

The terminal 100 comprises an antenna 104 for transmitting and receiving a radio-frequency signal. The received signal is amplified and demodulated into a baseband signal in a RF part 113, and the baseband signal is processed in the signal processing block 114 in the baseband part 110 (BB). Correspondingly, the baseband signal to be transmitted is processed according to the cellular system specifications in block 114 and modulated into a RF signal and amplified in the RF part 113 so as to be sent to the antenna 104.

Signal processing and the RF part are controlled by a processor 111 which has a memory unit 112 for storing programs and parameters. A regulator 115 produces operating voltages for the baseband part and the RF part.

A line adapter part 130 (LA) includes an audio part 134 which matches the audio signal of the baseband part 110 to the audio signals of the telephone apparatus 101 and the fax machine 102. A DTMF indicator 133 detects the dialling signals transmitted via the audio line and conveys them to the processor 131 of the line adapter part. A HOOK indicator 135 detects the status of the receiver hook of the telephone apparatus and conveys the status information to the processor 131 and to a tone generator 136. The tone generator 136 generates the tones for the telephone apparatus 101 and fax machine 102 according to the connection status information sent by the cellular system. A ring generator 137 produces a high-voltage ringing signal (say, 45 V AC) for the ringing function of the telephone apparatus. The line voltage/loop current (say, 40 V DC) is produced by a DC generator 138 so that it corresponds to the specifications of the telephone apparatus 101 and the fax machine 102. The processor 131 controls the line adapter blocks and is connected to the processor 111 of the mobile part 110 via a serial interface, for example. The memory 132 of the processor 131 is used for storing the processor software, connection status information and the parameters related to the line adapter functions, among other things. The WLL terminal further comprises a battery unit 103 and regulators 115 and 139 to produce the operating voltages for the equipment. The WLL terminal blocks 103, 110, 113 and 130 usually constitute an integrated equipment block 120.

The prior art solution described above is disclosed in more detail in patent document [1] U.S. Pat. No. 5,117,450 (WO 9014729). Other WLL systems according to the prior art are described in patent documents [2] U.S. Pat. No. 4,658,096, [3] U.S. Pat. No. 4,737,975, [4] U.S. Pat. No. 4,775,997 and [5] U.S. Pat. No. 4,922,517, for example.

In the conventional WLL systems, the user has access only to the services of the public switched telephone network PSTN. WLL systems that are based on e.g. the GSM/DCS system often include other services, too, such as the short message service, information on received calls, etc., and these services usually involve displaying of information which is processed in the system in the form of characters. Processing and displaying of such information is not possible in the WLL systems of the prior art, so the user of a WLL terminal can have no access to these services.

SUMMARY OF THE INVENTION

The object of the invention is to provide a solution whereby it is possible to use WLL network services where character-based information is processed and displayed.

According to the present invention, a WLL terminal includes a display unit, and character-based first data is converted in the WLL terminal to second data to be displayed on the display unit. Said first data is converted to the second data advantageously in such a manner that a pixel matrix shaped bitmap is first formed on the basis of the character-based first data and then a line code is formed according to said bitmap. Using known facsimile transmission technology, the line code is transferred to a fax machine serving as a display unit and displayed by the fax machine.

The method according to the invention for processing information in a WLL terminal is characterized in that
said information is stored (221, 231) in the WLL terminal as character-based first data,
said information stored as character-based first data is converted (222, 223) in the WLL terminal to second data to be displayed on a displaying means, and
said information is displayed (226) on the displaying means.

The WLL terminal according to the invention is characterized in that it comprises means for processing information as character-based first data, displaying means for displaying said information, and means for converting said first data to second data to be displayed by said displaying means.

Preferred embodiments of the invention are described in the sub-claims of this document.

BRIEF DESCRIPTION OF THE DRAWING

The invention is described in greater detail with reference to the attached drawing, wherein.

DETAILED DESCRIPTION OF THE INVENTION

Figure 1:
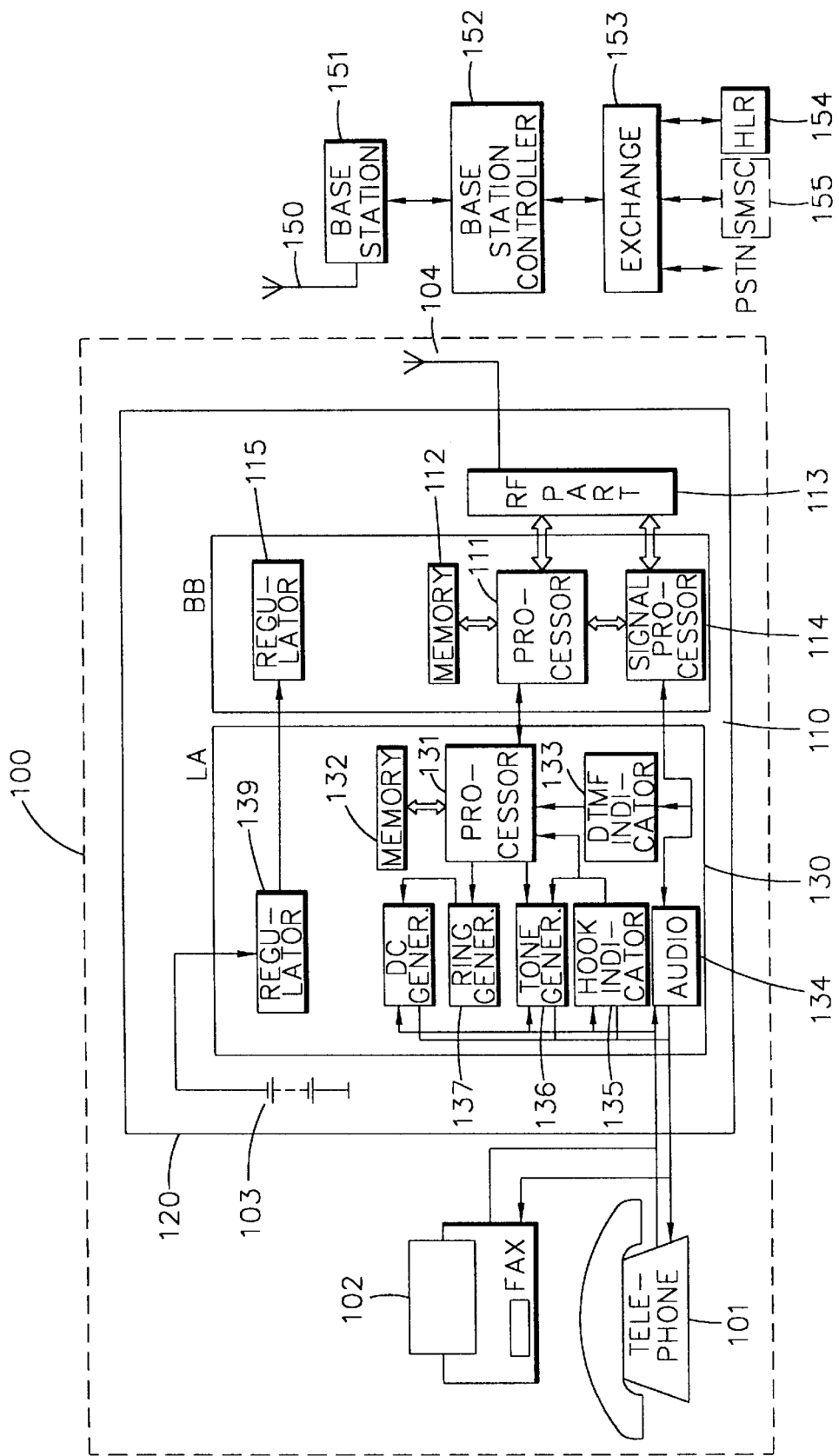
FIG. 1 shows a WLL terminal according to the prior art.

FIG. 1 was described above in connection with the description of the prior art.

Figure 2:
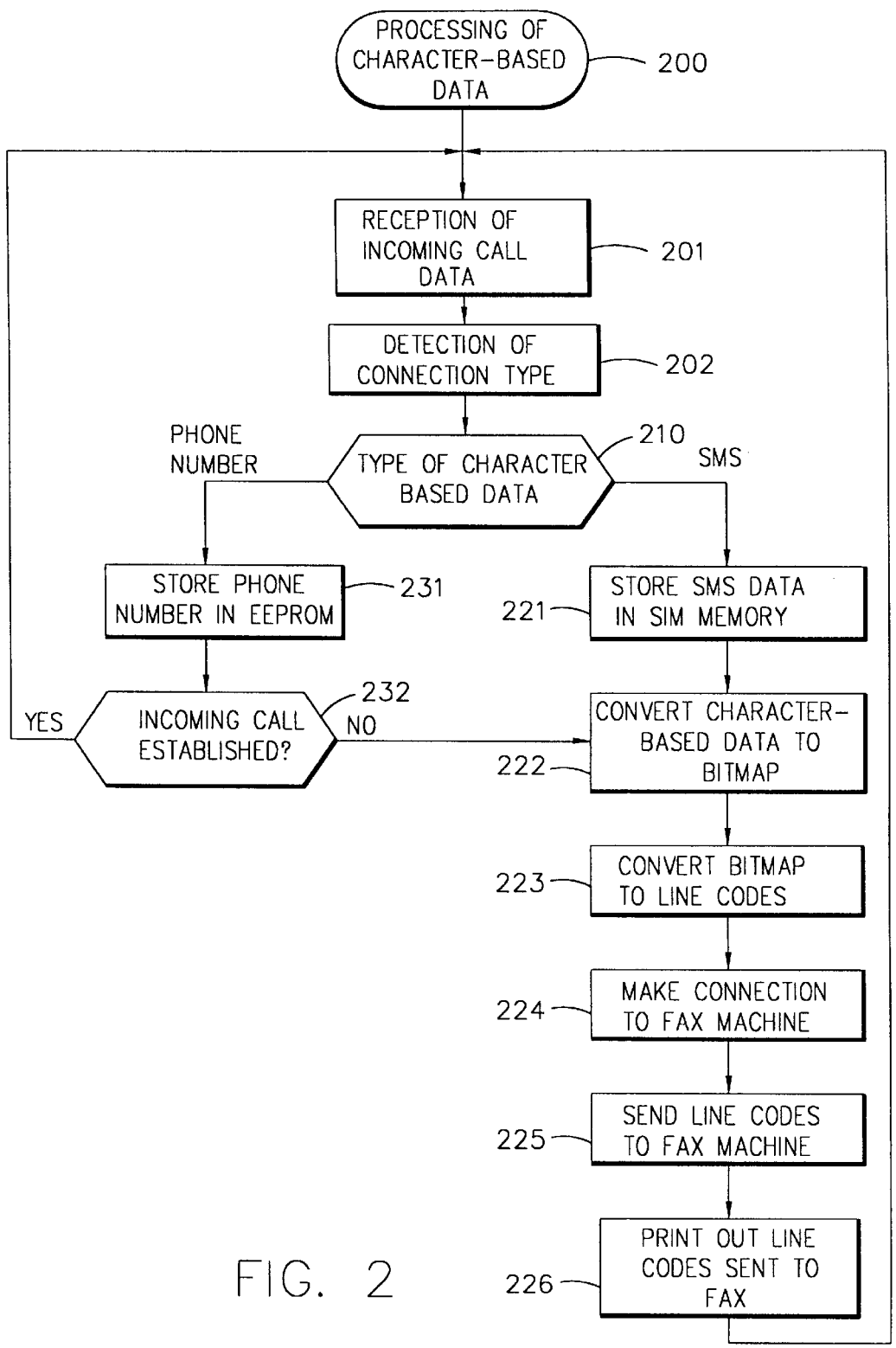
FIG. 2 shows a flow chart of a method according to the invention for processing character-based information in a WLL terminal.

FIG. 2 shows a flow chart of a method 200 according to the invention for processing information in a WLL terminal. First, an incoming call is detected and the information related to the incoming call is received, block 201. The incoming call type is determined on the basis of the received information, blocks 202 and 210. If the received information is a short message, the short message is stored in character format e.g. in the memory of a SIM card connected to the terminal, block 221. If the received character-based information is the caller's phone number, the phone number is stored e.g. in the EEPROM memory of the terminal, block 231. If the incoming call is not established, the received caller's phone number is output as a missed call information, block 232.

The printing of received character-based information is performed in such a manner that first the character-based data is converted to a bitmap, block 222, and then the bitmap is converted to line codes, block 223. One possible format of the bitmap and line code is described in more detail in connection with the description of FIG. 3. After the data conversion, a communication link is established to a fax machine serving as a display device, block 224. Then the line codes are transferred to the fax machine, block 225, and printed out by the fax machine, block 226. The communication between the WLL terminal and the fax machine can advantageously be based on the voice-frequency transmission protocol generally used in the transmission of facsimiles. Then the data to be transferred is coded for the voice-frequency transmission and the corresponding decoding is carried out in the fax machine. This procedure is disclosed in more detail e.g. in [6] CCITT Terminal Equipment and Protocols for Telematic Services; Recommendations T.0 to T.63, especially Recommendation T.30.

Figure 3:
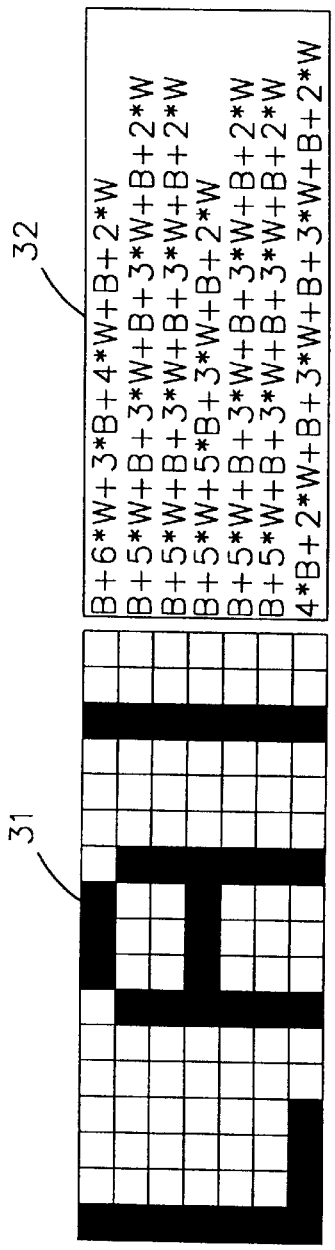
FIG. 3 shows a procedure according to the invention for converting character-based first data to second data.

FIG. 3 shows a data conversion for fax machine output. First, a data group corresponding to one line to be displayed is extracted from the data. Then, each character in the data group is converted to bitmap format 31. A line formed of these bitmap characters is further converted to the form in which it will be sent to a fax machine. The conversion is performed by forming line codes 32 from the bitmap, each line code comprising a line start character, codes representing the lengths of the black and white parts of the line, and a line end character. Then the characters converted to line codes are transferred to the fax machine by establishing a communication link to the fax machine, as described above.

Figure 4:
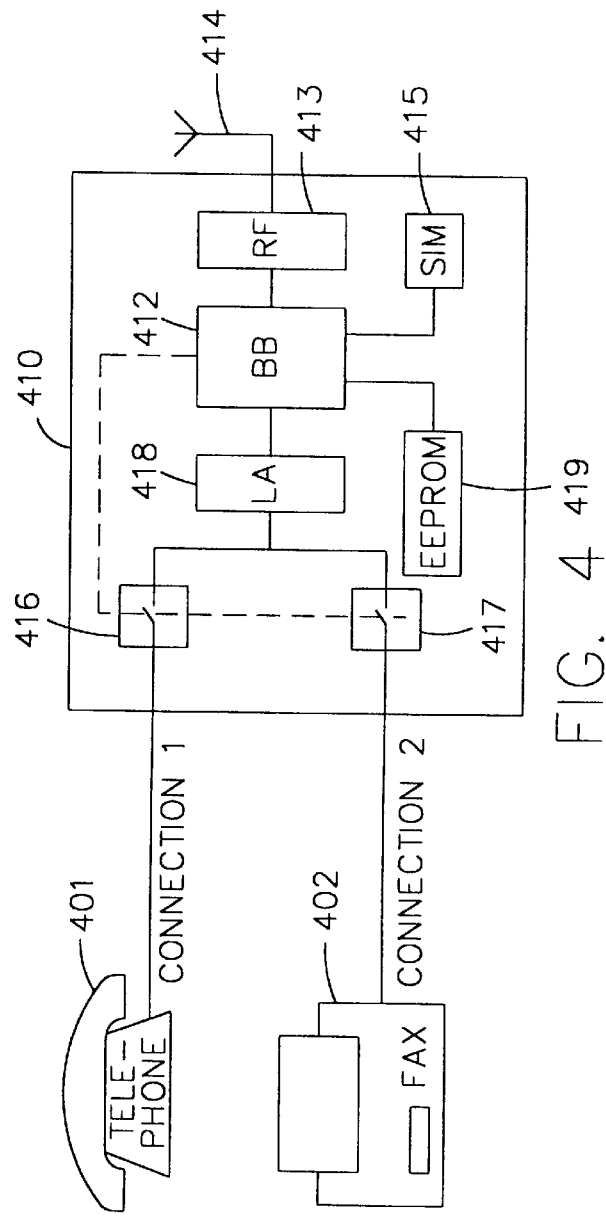
FIG. 4 shows a WLL terminal according to the invention.

FIG. 4 shows a simplified block diagram of a terminal according to the invention. The antenna and RF part for the reception of a signal sent from a base station correspond to the same blocks of the terminal shown in FIG. 1. The character-based information related to the incoming call is recognized in the baseband part. A SIM card is connected to the baseband part 412 (BB) to enable the storing of received short messages, for example. In addition, an EEPROM memory 419 is connected to the baseband part to enable the storing of callers' phone numbers for missed incoming, calls, for example. The baseband part 412 is connected to a telephone set 401 and fax machine 402 by means of a line adapter 418 and switches 416 and 417.

The printing of received character-based information is performed as follows: the character-based data is first converted in the baseband part 412 to a format displayable by a fax machine. Then a communication connection is established between the baseband part 412 and the fax machine 402. To establish the connection the baseband part 412 includes means for performing so-called faxmodem functions so that the connection established corresponds to an ordinary fax connection. The line adapter 418 serves as a transmission signal level adapter between the fax machine and the baseband part and possibly generates the control signals related to the call establishment. The baseband part 412 drives the switches 416 and 417 so that during the communication between the baseband part and the fax machine switch 417 is closed and switch 416 is open. Thus the switches prevent the signals from being directed to the telephone apparatus 401. Otherwise, the operation of the blocks shown in FIG. 4 corresponds to the operation of the blocks of the terminal according to the prior art shown in FIG. 1.

Character-based data can be displayed according to the invention by means of a display device other than a fax machine. Such a display device can be e.g. a liquid crystal display (LCD). The conversion of the character-based data to a form suitable for the display unit is then carried out in accordance with the specifications of the display device used. The display device may be either a separate auxiliary or an integral part of the terminal.

Conversion and printing of the character-based data can be performed automatically after the data have been received and stored in the memory of the terminal, as in the procedure according to FIG. 2. Alternatively, printing can be activated by the user, e.g. by pushing a print button on the terminal. Then the stored character-based data are read from the memory prior to the conversion and printing.

Above it was described how the invention can be applied in displaying short messages and phone numbers related to incoming calls. The present invention can also be used for displaying other information processed in character format. For example, in connection with the maintenance of a terminal or WLL system, status information can be printed out in the manner according to the invention.

Above it was described embodiments of the method according to the invention. The principle according to the invention can of course vary within the scope of the invention defined by the claims set forth below as regards the implementation details and fields of application, for example.

What is claimed is:

1. A method for processing information in a WLL (wireless local loop) terminal, comprising the steps of:
   storing said information in the WLL terminal as character-based first data,
   converting said information stored as character-based first data to second data comprising facsimile readable line code to be displayed as a facsimile presentation on a displaying means, and
   displaying said information on said displaying means as a facsimile presentation.

2. The method of claim 1, further comprising a step of receiving said information in the WLL terminal from a WLL system.

3. The method of claim 1, wherein, in said step of converting said first data to the second data, there is a step of forming a bitmap on the basis of the character-based first data and then a further step of forming the line code on the basis of said bitmap.

4. The method of claim 3, wherein said converting is performed one displayed character line at a time.

5. The method of claim 1, wherein said second data comprises line codes that include a start character, at least one character representing the lengths of black/white pixel sequences, and an end character.

6. The method of claim 1, wherein said second data is coded to a voice-frequency signal to be transferred to said displaying means.

7. The use of the method of claim 1, for displaying short messages, incoming call phones number information or system status information.

8. A WLL (wireless local loop) terminal, comprising means for storing information as character-based first data, displaying means for displaying said information, and means for converting said first data to second data having the form of facsimile readable line code to be displayed as a facsimile presentation by said displaying means.

9. WLL terminal of claim 8, wherein said converting means includes means for converting said information to third data for transferring said information to said displaying means.

10. The WLL terminal of claim 8, wherein said displaying means is a fax machine.

11. The WLL terminal of claim 9, further comprising means for establishing a connection and for transferring said information to said fax LAB machine as a voice-frequency signal.

12. The WLL terminal of claim 8, wherein said converting means includes means for converting the first data to a bitmap.

13. The WLL terminal of claim 12, wherein said converting means includes means for converting said bitmap to second data in the line code format.

14. The WLL terminal of claim 8, wherein said displaying means is an integral part of said WLL terminal.

15. The WLL terminal of claim 8, further comprising means for receiving said information from a WLL system base station.

16. The WLL terminal of claim 7, for displaying short messages, incoming call phone number information or system status information.

* * * * *

UNITED STATES PATENT AND TRADEMARK OFFICE
CERTIFICATE OF CORRECTION

PATENT NO. : 5,953,675
DATED : 9/14/99
INVENTOR(S) : Ossi Rabina et al.

It is certified that error appears in the above-identified patent and that said Letters Patent is hereby corrected as shown below:

In Column 5, line 13, after "The" delete --use of the--. (Claim 7)

In Column 5, line 14, delete "phones" and replace with --phone--. (Claim 7)

In Column 5, line 22, before "WLL" insert --The--. (Claim 9)

In Column 6, line 5, after "fax" delete --LAB--. (Claim 11)

Signed and Sealed this

Ninth Day of May, 2000

Attest:

Attesting Officer

Q. TODD DICKINSON

Director of Patents and Trademarks